United States Patent [19]

Mahaney

[11] Patent Number: 5,753,903
[45] Date of Patent: May 19, 1998

[54] METHOD AND SYSTEM FOR CONTROLLING LIGHT INTENSITY IN A MACHINE VISION SYSTEM

[75] Inventor: Craig Lyle Mahaney, Milan, Mich.

[73] Assignee: MEDAR, Inc., Farmington Hills, Mich.

[21] Appl. No.: 743,206

[22] Filed: Nov. 5, 1996

[51] Int. Cl.$^6$ ..................................... G01J 1/32
[52] U.S. Cl. ................... 250/205; 250/214 AG; 315/182; 330/278
[58] Field of Search .............. 250/205, 214 AG, 250/214 RC; 315/182; 330/86, 278, 279, 282

[56] References Cited

U.S. PATENT DOCUMENTS

| | | | |
|---|---|---|---|
| 4,211,929 | 7/1980 | Tamburelli | 250/205 |
| 4,669,788 | 6/1987 | Wittmer | 356/300 |
| 5,247,345 | 9/1993 | Curtis | 356/427 |
| 5,379,649 | 1/1995 | Kalotay | 73/861.38 |
| 5,489,771 | 2/1996 | Beach et al. | 250/205 |
| 5,514,864 | 5/1996 | Mu-Tung et al. | 250/205 |

*Primary Examiner*—Stephone B. Allen
*Attorney, Agent, or Firm*—Brooks & Kushman P.C.

[57] ABSTRACT

The intensity of each lamp which illuminates an object at an inspection station is controlled by controlling driving voltage applied to a power supply which supplies electrical power to the lamp. A phototransistor is used to sense the intensity of the lamp through an optical fiber. The sensor is followed by a digitally-controlled, variable gain circuit whose output is fed to an A-D converter. A microprocessor analyzes the digital signal from the A-D converter and corrects the driving voltage to the power supply to keep the intensity output of the lamp constant, as seen by a camera of a machine vision system. In this way, feedback corrects for a degraded lamp output due to aging. Preferably, the control of the level of lamp intensity can be changed from a remote system console of the machine vision system to reduce the need for access to internal parts, thereby reducing the probability that human error may cause a malfunction. The method and system of the present invention are particularly useful for inspection of digital versatile discs (DVD's) where the illumination must be changed. Also, the method and system are particularly useful in automated production lines where both audio and DVD discs are inspected. The lamp intensity control method and system can quickly change intensities for the appropriate discs.

11 Claims, 2 Drawing Sheets

METHOD AND SYSTEM FOR CONTROLLING LIGHT INTENSITY IN A MACHINE VISION SYSTEM

TECHNICAL FIELD

This invention relates to methods and systems for controlling light intensity in machine vision systems and, in particular, to methods and systems for controlling light intensity to lie within a predetermined narrow range of light intensities in machine vision systems.

BACKGROUND ART

It is desirable to control light or lamp intensity levels in a machine vision system so that the machine vision system is prevented from detecting any change in an object at an inspection station when only the lamp intensity level varies. If the intensity can be maintained within a narrow range, the machine vision system will not detect any change except change due to variations in the object but not due to light intensity changes as the lamp ages, for example.

Analog feedback circuitry is commonly used for the purpose of lamp intensity stabilization. For example, the U.S. Pat. No. 5,489,771 to Beach et al. discloses a light calibration system including a compact LED source with feedback control of intensity. The source is positioned in the focal plane of the microscope objective and produces flat-field illumination. The source can be used to determine the performance of microscope optics and camera response. It can also be used as a standard light source for calibration of experimental systems. Selectable light intensities are produced by controlling the LED input power via a feedback circuit consisting of a photodiode that detects output light intensity.

The U.S. Pat. No. 5,247,345 to Curtis discloses a photometer which compensates for variations in the lamp intensity during the period over which measurements are taken. A feedback circuit is provided between a reference photodetector and the light source for causing the light source intensity to asymptotically approach a final stable value in a smooth exponential curve. A signal processor processes outputs of the reference and sample photodetectors taken at different times so as to compensate for variations in the source intensity over the time period during which the outputs are taken.

The U.S. Pat. No. 5,379,649 to Kalotay discloses a meter which uses optical fiber sensors whose flexing of the fiber causes a corresponding change in its optical conductivity and a corresponding change in the intensity of the light transmittal through the fiber from a light signal source to a signal detector. The modulated light signal received by the optical signal detector is converted to an electrical signal which is processed to generate mass flow rate and other information for flowing material. A feedback circuit for the light signal source monitors the average intensity of the light received by the signal detector and controls the drive signal applied to the light source to maintain the average intensity of the light signal received by the detector at a predetermined initial intensity.

The U.S. Pat. No. 4,669,877 to Wittmer discloses a digital, gain-controlled, current-to-voltage amplifier having particular utility for interfacing with and forming part of a spectrophotometer system with a photomultiplier tube being responsive to light for producing an analog current proportional to the intensity thereof. The digital, gain-controlled, current-to-voltage amplifier incorporates a current-switched, multiplying, digital-to-analog converter inside its feedback loop. The feedback loop impedance may be maintained constant as its gain is varied under control of a software programmed microcomputer.

Some problems inherent in analogue feedback prior art approaches are cost and lack of flexibility and reliability, especially when they are designed to tune the feedback loop for a desired response to an arbitrarily complex function.

SUMMARY OF THE INVENTION

An object of the present invention is to provide an improved method and system for controlling light intensity in a machine vision system which solves many of the problems of the prior art.

Another object of the present invention is to provide a relatively inexpensive, flexible and reliable method and system for controlling light intensity in a machine vision system.

Yet another object of the present invention is to provide a digital method and system for controlling light intensity wherein the intensity is controlled to lie within a range of intensities so narrow that a machine vision system is prevented from detecting any change in the intensity.

Yet still another object of the present invention is to provide a method and system for controlling lamp intensity in a machine vision system from a remote system console and to provide information about the control process to the console.

In carrying out the above objects and other objects of the present invention in a machine vision system including a power supply for supplying electrical power to a lamp in response to a control signal, the lamp, in turn, radiating light to illuminate an object at an inspection station, a method is provided for controlling intensity of the lamp so that the machine vision system is unable to detect any change in lamp intensity. The method includes the steps of storing a predetermined reference for the power supply, generating a digital feedback signal based on actual intensity of the radiated light, and digitally processing the digital feedback signal to obtain an apparent control signal for the power supply. The method also includes the step of digitally calculating an error based on a difference between the predetermined reference and the apparent control signal. Finally, the method includes the step of generating an actual control signal as a function of the error to control the power supply which, in turn, controllably supplies electrical power to the lamp so that the lamp has an intensity within a desired range of intensity levels so as to prevent the machine vision system from detecting any change in actual intensity level within the desired range of intensity levels.

Preferably the step of generating the digital feedback signal includes the step of sensing a portion of the radiated light to obtain an electronic signal.

Also, preferably, the method includes the steps of storing a predetermined gain factor and amplifying the electronic signal based on the predetermined gain factor.

Yet, still preferably, the method includes the step of determining information about the control of the lamp intensity based on the apparent control signal and communicating the information to an operator.

Further in carrying out the above objects and other objects of the present invention in a machine vision system including a power supply for supplying electrical power to a lamp in response to a control signal, the lamp, in turn, radiating light to illuminate an object at an inspection station, a control system is provided for controlling intensity of the lamp so that the machine vision system is unable to detect any change in the lamp intensity. The control system includes a photosensor for sensing output light intensity from the lamp to obtain an electronic signal based on actual intensity of the radiated light to obtain an electronic signal. The system also includes a reference memory for storing a predetermined reference for the lamp supply and a signal processor coupled to the photosensor for processing the electronic signal to obtain a digital feedback signal. The system further includes a microprocessor coupled to the reference memory and the signal processor to process the digital feedback signal to obtain an apparent control signal for the power supply and to calculate an error based on the difference between the predetermined reference and the apparent control signal. Finally, the control system includes a circuit coupled to the microprocessor for generating an actual control signal as a function of the error to control the power supply which, in turn, controllably supplies electrical power to the lamp so that the lamp has an intensity within a desired range of intensity levels so as to prevent the machine vision system from detecting a change in actual intensity level within the desired range of intensity levels.

Preferably, the photosensor is a phototransistor and the signal processor includes a variable gain amplifier circuit including an amplifier portion coupled to the phototransistor for amplifying the electronic signal based on a predetermined gain factor.

Also, preferably, the variable gain amplifier circuit includes a gain memory for storing the predetermined gain factor therein.

Still, preferably, the control system preferably includes an optical fiber positioned to receive a portion of the radiated light and coupled to the phototransistor for transmitting a portion of the radiated light to the phototransistor.

Yet, still preferably, the control system includes a terminal device coupled to the microprocessor for receiving information about the control of the lamp intensity from the microprocessor.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
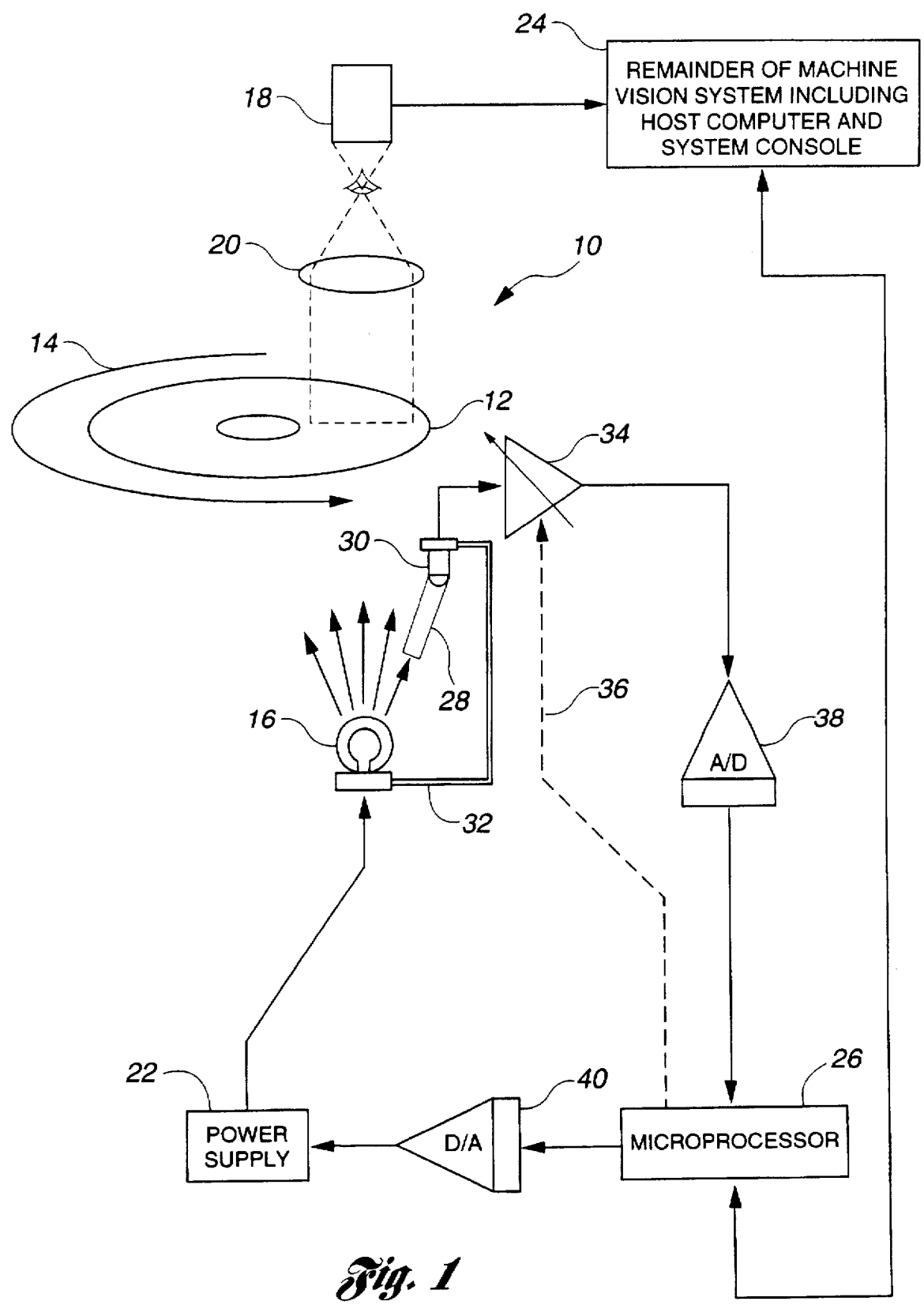
FIG. 1 is a schematic diagram illustrating a machine vision system and a control system for controlling intensity of a lamp of the machine vision system.
Figure 2:
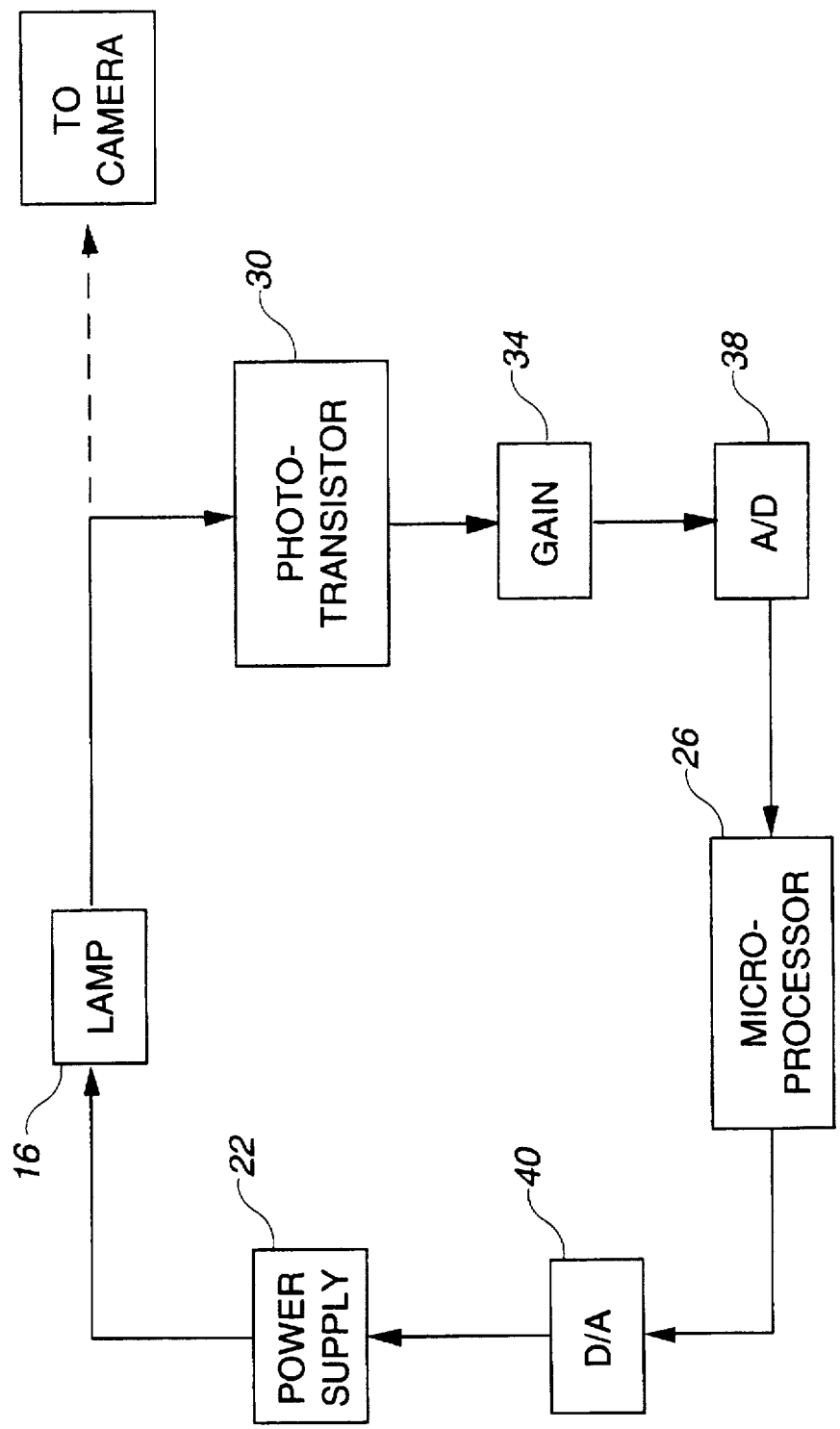
FIG. 2 is a schematic block diagram illustrating a feedback loop for controlling a power supply of the lamp.

Referring now to the drawing Figures, there is illustrated in FIG. 1 an inspection station, generally indicated at 10, at which objects such as optical discs are inspected by a machine vision system. The optical discs may be an optically transparent or translucent audio discs or DVD's (digital versatile discs) but obviously may be other types of objects. The control method and control system of the present invention are preferably adapted to quickly change intensity levels of a lamp 16 for a particular disc 12 to be inspected.

Rotation of the disc 12, as indicated by an arrow 14, allows the imaging or radiation of light from the lamp 16 to pass through the disc 12 to be imaged onto a camera 18 through a lens 20 of the machine vision system. While only a single light source, such as the lamp 16, is illustrated, it is to be understood that the method and system of the present invention may be utilized to control multiple light sources such as four light sources in a machine vision system.

The lamp 16 is energized from a power supply 22, which, in a preferred form of the invention, applies 0 to 110% of its rated voltage as an external control voltage applied thereto from a circuit 40 varies from 0 to 2.75 volts. In other words, the intensity of the lamp 16 is controlled by controlling the voltage applied to it from the power supply 22.

The remainder of the machine vision system illustrated at block 24 preferably includes an image digitizer/frame grabber, filters, an image processing board, system bus, a host computer, and a system console such as a terminal device as can be found in many conventional machine vision systems. The terminal device may comprise a monitor, a light display, or other device used for communicating with a computer on which the operator's input and/or the computer's output can be displayed.

The method and system of the present invention, in general, controls intensity of the lamp 16 so that the machine vision system is unable to detect any change in lamp intensity solely due to the light from the lamp 16. In other words, control is accomplished so as to prevent the machine vision system from detecting any change in actual intensity level within a desired range of intensity levels. Preferably, the control method and control system utilize digital feedback by means of a feedback loop including a microprocessor 26. However, it is to be understood that the method and system of the present invention can also be carried out through the use of a microcontroller which typically includes RAM, ROM, a microprocessor, input and output ports, timers, and A-D and D-A converters on a microcontroller chip(s).

Referring again to FIG. 1, a portion or sample of the light intensity radiated from the lamp 16 is received by an optical fiber 28 positioned to receive a portion of radiated light. The optical fiber 28, in turn, is supported together with a photosensor, such as a phototransistor 30, in a relative fixed position by a support 32 to maintain a relatively constant relationship between a receiving end of the optical fiber 28 and the lamp 16.

The output from the phototransistor 30 is an electronic signal which is fed into a variable gain amplifier circuit 34 having an internal gain memory for storing a predetermined gain factor. The predetermined gain factor is preferably downloaded along a line 36 from the microprocessor 26 prior to the inspection process. The gain factor is thereafter used to adjust the gain of the circuit 34.

The resulting analog signal from the circuit 34 is then converted into its digital counterpart by an A-D converter 38 appropriate for use with the microprocessor 26. The microprocessor 26 then reads the digital signal from the A-D converter 38 and uses it for input to a control program stored in microprocessor memory. The microprocessor memory also stores a predetermined reference for the power supply 22 in a reference memory portion thereof. The predetermined reference may represent a voltage control signal such as 1 volt which would be normally supplied to the power supply 22 to enable the lamp 16 to be controlled within a predetermined desired range of lamp intensities.

In particular, the programmed microprocessor processes the digital feedback received from the A-D converter 38 and processes it to obtain an apparent control signal which corresponds to a control signal which appears to be applied to the power supply 22 to control the power supply 22 to obtain the resulting sensed light intensity.

The programmed microprocessor 26 then compares the apparent control signal with the predetermined reference and calculates an error based on the difference between the predetermined reference and the apparent control signal.

For example, if the predetermined reference indicates a control voltage to the power supply 22 of 1 volt, but the apparent control signal indicates a control signal to the power supply 22 of 0.8 volts, a resulting error of 0.2 volts is determined. Based on the error (in this case 0.2 volts), the programmed microprocessor 26 then generates a larger digital output signal which is fed to a D-A converter 40 and the resulting analog output signal from the D-A converter circuit 40 is then fed to the power supply 22. In the present example, this analog output signal increases the electrical power applied to the lamp 16 by the power supply 22 in an attempt to maintain the apparent control signal equal to the reference.

Preferably, the D-A converter 40 has 10 bit resolution and the resolution of the intensity guarantees at least two steps per detectable gray level change as seen by the remainder of the machine vision system.

In this way, the control method and control system correct the lamp output due to aging. In other words, the microprocessor 26 analyzes the sensor information from the phototransistor 30 and corrects the driving voltage to the power supply 22 so that the output intensity of the lamp 16 remains relatively constant. In other words, the digital feedback corrects for degraded lamp output due to lamp aging.

The microprocessor 26 is in communication with a system console in block 24. In this way, the remote system console has the ability to change intensity levels remotely (by changing the value contained in the reference memory and/or the gain memory through the microprocessor 26) to reduce the need for access to the internal components of the machine vision system, thereby reducing the probability that human error may cause a malfunction (i.e. wiring shorts or opens, misaligned optics, etc.).

Furthermore, the use of the microprocessor 26 instead of analog feedback circuitry allows the feedback loop to be tuned for a desired response via software to an arbitrarily complex function.

Also, the microprocessor 26, when properly programmed, is capable of generating information about the control process and the lamp 16 itself. For example, information can be generated regarding the intensity, operating time, and rate of change of voltage for constant lamp output. In this way, an estimation can be made for lamp life and this allows for lamp replacement as scheduled maintenance.

While the best mode for carrying out the invention has been described in detail, those familiar with the art to which this invention relates will recognize various alternative designs and embodiments for practicing the invention as defined by the following claims.

What is claimed is:

1. In a machine vision system, including a power supply for supplying electrical power to a lamp in response to a control signal, the lamp in turn radiating light to illuminate an object at an inspection station, a method for controlling intensity of the lamp so that the machine vision system is unable to detect any change in lamp intensity, the method comprising the steps of:

storing a predetermined reference for the power supply;

generating a digital feedback signal based on actual intensity of the radiated light;

digitally processing the digital feedback signal to obtain an apparent control signal for the power supply;

digitally calculating an error based on a difference between the predetermined reference and the apparent control signal; and generating an actual control signal as a function of the error to control the power supply which, in turn, controllably supplies electrical power to the lamp so that the lamp has an intensity within a desired range of intensity levels so as to prevent the machine vision system from detecting any change in actual intensity level within the desired range of intensity levels.

2. The method of claim 1 wherein the step of generating the digital feedback signal includes the step of sensing a portion of the radiated light to obtain an electronic signal.

3. The method of claim 2 further comprising the step of storing a predetermined gain factor and amplifying the electronic signal based on the predetermined gain factor.

4. The method as claimed in claim 1 further comprising the steps of determining information about the control of the lamp intensity based on the apparent control signal and communicating the information to an operator.

5. In a machine vision system, including a power supply for supplying electrical power to a lamp in response to a control signal, the lamp in turn radiating light to illuminate an object at an inspection station, a control system for controlling intensity of the lamp so that the machine vision system is unable to detect any change in lamp intensity, the control system comprising:

a photosensor for sensing output light intensity from the lamp based on actual intensity of the radiated light to obtain an electronic signal;

a reference memory for storing a predetermined reference for the power supply;

a signal processor coupled to the photosensor for processing the electronic signal to obtain a digital feedback signal;

a microprocessor coupled to the reference memory and the signal processor and programmed to process the digital feedback signal to obtain an apparent control signal for the power supply and to calculate an error based on the difference between the predetermined reference and the apparent control signal; and a circuit coupled to the microprocessor for generating an actual control signal as a function of the error to control the power supply which, in turn, controllably supplies electrical power to the lamp so that the lamp has an intensity within a desired range of intensity levels so as to prevent the machine vision system from detecting any change in actual intensity level within the desired range of intensity levels.

6. The control system as claimed in claim 5 wherein the photosensor is a phototransistor.

7. The control system as claimed in claim 6 wherein the signal processor includes a variable gain amplifier circuit including an amplifier portion coupled to the phototransistor for amplifying the electronic signal based on a predetermined gain factor.

8. The control system as claimed in claim 7 wherein the variable gain amplifier circuit includes a gain memory for storing the predetermined gain factor.

9. The control system of claim 5 further comprising an optical fiber positioned to receive a portion of the radiated light and coupled to the photosensor for transmitting the portion of radiated light to the photosensor.

10. The control system of claim 5 further comprising a terminal device coupled to the microprocessor for communicating with the microprocessor.

11. The control system as claimed in claim 10 wherein the microprocessor is programmed to determine information about the control of the lamp intensity based on the apparent control signal and to communicate the information to the terminal device.

* * * * *